United States Patent Office 3,605,485
Patented Sept. 20, 1971

3,605,485
MONITORING DUST CONCENTRATION
Stanislaw Badzioch and Peter G. W. Hawksley, London, England, assignors to Coal Industry (Patents) Limited, London, England
Filed May 8, 1970, Ser. No. 35,645
Claims priority, application Great Britain, May 16, 1969, 25,012/69
Int. Cl. B01d 45/12; G01n 31/00
U.S. Cl. 73—28                10 Claims

ABSTRACT OF THE DISCLOSURE

A method of monitoring dust includes passing a stream of gas containing dust into a centrifugal flow separating device. Whilst one characteristic of gas flow through the device is maintained constant and the dust concentration in the device is allowed to increase, another characteristic of gas flow through the device is monitored.

---

This invention relates to monitoring dust concentration.

The invention is applicable where it is required to measure the dust concentration for example in flue gases or in air in mines or other places or, without true measurement, to determine when dust concentration rises above, or falls below, a predetermined value and the expression "monitoring" throughout this specification includes measuring as such and also a mere recognition of change of concentration relative to a predetermined value for example for the purposes of giving an indication such as an alarm.

The term "dust" throughout means small particles ordinarily referred to as dust and includes particles which may be called grit or ash.

It is an object of the invention to provide a method of and apparatus for monitoring dust at low concentrations, though the invention is generally applicable regardless of concentration.

According to the invention, there is provided a method of monitoring dust concentration comprising the steps of passing a stream of gas containing dust into a centrifugal flow separating device, maintaining constant one characteristic of gas flow through the device, allowing the dust concentration in the device to increase, and monitoring another characteristic of gas flow through the device.

For example, the characteristic monitored may be the difference between the pressure of the gas at the inlet to the device and the pressure of the gas at the outlet, the characteristic kept constant being the rate of flow through device.

Alternatively, the characteristic monitored may be the rate of flow of gas through the device, the difference in pressure between the inlet and outlet of the device being then kept constant.

The method can readily be carried out repeatedly at regular intervals and in each instance monitoring performed after the same period of time has elapsed to allow dust to collect in the device, which must have means for enabling the dust collected to be removed at regular intervals. i.e. periodically before the next period of dust collection begins.

If a record were kept of the monitored characteristic with such repetition of the method, the record would be of saw-tooth pattern, the envelope of which would represent the variation of dust concentration with time.

The method is therefore applicable to the control of manufacture in a plant so as to control, in turn, the dust concentration in a gas stream leaving the plant.

If absolute determination of dust concentration in terms of weight per unit volume of gas is required then calibration of the monitoring equipment, using samples of dust which is to be monitored is necessary.

Apparatus for carrying out the method according to the invention comprises a centrifugal flow separating device, a gas inlet to said device located at one end of the device and positioned so as to create rotary flow, a longitudinal gas outlet from the device and located at said end, a closure member situated at the other end of the device and adapted to allow removal of dust collected in the device, a mechanism responsive to the characteristic of gas flow to be monitored, and means adapted to keep the other characteristic constant.

The apparatus may include a gas impeller positioned either upstream or downstream of the separating device for forcing the gas stream through the device.

In one form of the apparatus the mechanism is a pressure transducer connected to respond to the difference in pressure between the inlet and outlet of the device, and said means is adapted to keep the rate of gas flow constant.

In another form of apparatus, the mechanism comprises an orifice-type flowmeter with a pressure transducer responsive to changes of flow through the orifice and said means is adapted to keep constant the pressure difference between the inlet and outlet of the separating device.

Alternatively, in that case, the mechanism may be a rotary flow meter with, for example, the movement of the cone of the rotary flow meter indicated electronically.

The method of monitoring dust concentration and two forms of apparatus will now be described by way of example with reference to the accompanying drawings in which.

Figure 1:
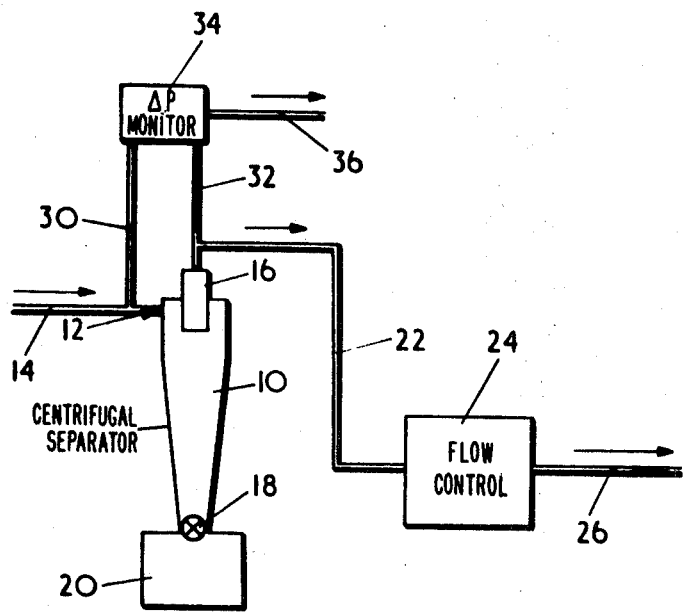
FIG. 1 is a schematic representation of one form of apparatus.

FIG. 1 shows a centrifugal gas flow separator, or cyclone, the body 10 of which has a tangential gas inlet at 12 connected to a pipe 14 through which a stream of gas containing dust enters the body 10 of the cyclone. The cyclone has at one end an axial outlet 16 for gas and at the other end has a removable plunger 18 to allow dust to fall from within the body 10 into a hopper 20.

The outlet 16 is connected to an outlet pipe 22 leading to means 24 for keeping the rate of gas flow constant in the form either of a critical orifice or a servo-operated valve, controlled by a signal from a pressure transducer responsive to the pressure across an orifice plate. The means 24 is connected by a further pipe 26 to a gas impeller (not shown) which creates suction to force gas through the cyclone.

The pipe 14 and the outlet 16 have probe tubes 30, 32, respectively, leading to a pressure transducer 34. The transducer 34 gives a signal, an electric signal typically, which passes, as represented schematically by the arrow 36, to a recorder (not shown).

The method of monitoring dust concentration in the gas stream is to allow dust to collect in the body 10 of the cyclone for a period of time, the plunger 18 closing the lower end of the cyclone body 10. During this time the dust concentration in the body 10 increases and the pressure difference between the inlet pipe 14 and the outlet 16 decreases continuously. The rate of flow of gas through the cyclone is kept constant.

If it is required only to determine whether the dust concentration is below a certain acceptable value, then the method can be performed at relatively infrequent intervals (these intervals need not be equal) and, by previous calibration by weighing collected dust samples, the transducer signal can be used to give an indication such as an alarm only if the magnitude of the decrease in pressure difference is greater than a predetermined value corresponding to the acceptable dust concentration. No actual measurement is performed. The dust collected in the body 10 must be removed after each determination by operation of the plunger 18.

However, if a record is required of the variation of dust concentration with time the method can be repeated at frequent and regular intervals which may be as long only as it is required for a sufficient amount of dust to collect and for the plunger 18 to be operated, the dust removed at the regular intervals i.e. periodically and the plunger replaced. The time allowed for dust to collect is the same in each instance.

The output from the transducer 34 is recorded and a saw-tooth record results, the envelope of which is an approximate indication of the variation of dust concentration with time. By suitable calibration the record can be used to yield the absolute value of dust concentration at any time. The transducer can be arranged to give a signal for this purpose which is relative to a zero reading corresponding to a gas stream free of dust.

Figure 2:
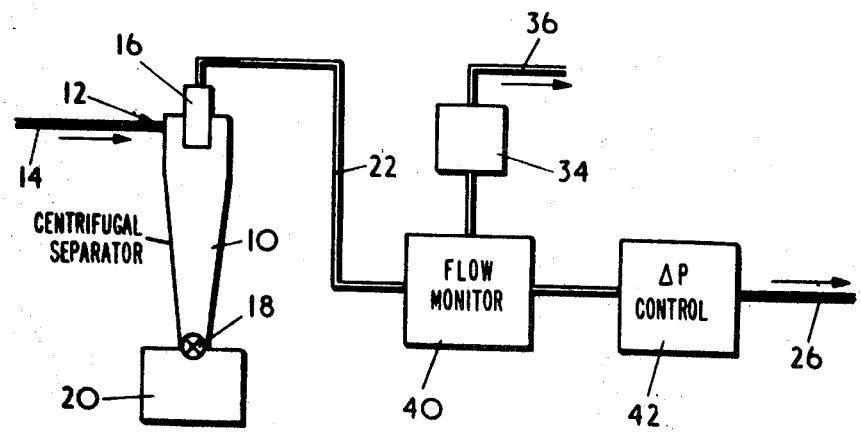
FIG. 2 is a schematic representation of a second form of apparatus.

The method is similarly performed using the apparatus shown in FIG. 2. The same reference numerals have been used wherever applicable. The differences over FIG. 1 are that the pressure transducer 34 is connected to respond to the pressure drop across a flowmeter 40 so as to respond to changes in rate of flow, the pressure difference between the inlet 12 and the outlet 16 being kept constant by means 42 in the form for example of a servo-operated valve controlled by a signal from a pressure transducer (not shown) responsive to the pressure difference between the inlet 12 and the outlet 16.

The apparatus shown in FIG. 2 can be used for the same purposes as that shown in FIG. 1.

For continuous monitoring the plunger 18 can be operated automatically at the proper intervals.

In a modification of the apparatus shown in FIG. 1, an orifice plate flowmeter can be used which produces the same pressure differential as the cyclone pressure drop under "no dust" conditions. The difference between the two pressures can then be recorded directly to serve as a measure of dust concentration.

In a further modification to the apparatus shown in FIG. 1, a constant pressure head could be applied to the gas instead of using the means described to keep the pressure drop across the cyclone constant.

The signal from the apparatus representing dust concentration can be used to control plant from which the gas stream issues so as to control the plant process and thus control the dust concentration in the gas stream.

By way of example gas flows of 4 to 10 cubic feet per minute may be used when a cyclone housing a body 1½ inches in diameter is suitable. At 3 cubic feet per minute a cyclone with a body of 1 inch diameter is suitable. When a small diameter cyclone is used, as little as 10 milligrams of dust accumulated in the body produces a readily measurable reduction in pressure drop. The reason for the decrease in pressure drop is not fully understood. Coarser particles give the greater decrease. The mass of dust and the particle size affect the decrease, but apparently the particle density does not.

Whilst a common form of centrifugal separator or cyclone has been described, it is possible to use one having a cylindrical instead of conical body and the inlet may be of involute form instead of tangential.

We claim:

1. A method of monitoring dust concentration comprising the steps of passing a stream of gas containing dust into a centrifugal flow separating device, maintaining constant one characteristic of gas flow through the device, accumulating the dust in the separating device, and monitoring another characteristic of gas flow through the device as a function of the accumulating dust.

2. A method according to claim 1 wherein the one characteristic monitored is the difference between the pressure of the gas at the inlet to the device and the pressure of the gas at the outlet of the device, the other characteristic maintained constant being the rate of flow of gas through the device.

3. A method according to claim 1 wherein the one characteristic monitored is the rate of flow of gas through the device, the other characteristic maintained constant being the difference in pressure between the inlet to the device and the outlet of the device.

4. A method as claimed in claim 1 including the step of removing any dust from the separating device before monitoring the said other characteristic.

5. A method as claimed in claim 4 wherein the step of removing any dust from the separating device is carried out periodically.

6. Apparatus for monitoring dust concentration comprising a centrifugal flow separating device, a gas inlet to said device located at one end of the device and positioned so as to create rotary flow, a longitudinal gas outlet from the device and located at said end, a closure situated at the other end of the device and adapted to allow accumulation or removal of dust collected in the device, means adapted to maintain constant one characteristic of gas flow through the device, and a mechanism to monitor another characteristic of gas flow through the device as a function of accumulating dust.

7. Apparatus according to claim 6 wherein the mechanism is a pressure transducer connected across the inlet and outlet of the separating device and adapted to respond to the difference in pressure between said inlet and said outlet, and said means is adapted to maintain the rate of flow of gas constant.

8. Apparatus according to claim 6 wherein the mechanism includes an orifice-type flowmeter with a pressure transducer responsive to changes of flow through the orifice, and said means is adapted to maintain the pressure difference between the inlet and the outlet of the device constant.

9. Apparatus according to claim 6 comprising gas impelling means situated upstream of the separating device and adapted to force the gas through the device.

10. Apparatus according to claim 6 comprising gas impelling means situated downstream of the separating device and adapted to force the gas through the device.

References Cited

UNITED STATES PATENTS

| | | | |
|---|---|---|---|
| 2,406,179 | 8/1946 | Walsh et al. | 73—19 |
| 3,266,226 | 8/1966 | Guller et al. | 55—27Y |
| 3,334,516 | 8/1967 | Cedrone | 73—61 |
| 3,499,315 | 3/1970 | Marino | 73—61 |

OTHER REFERENCES

Jackson, "Mechanical Equipment for Removing Grit and Dust From Bases," 1963, pp. 245–269, Pat. Off. Lib. No. TH7696J3.

RICHARD C. QUEISSER, Primary Examiner

E. J. KOCH, Assistant Examiner

U.S. Cl. X.R.

55—270, 274, 459; 73—61